Jan. 15, 1957           D. H. HOWRY          2,778,002

METHOD OF PRODUCING SHORT PULSE ECHO SIGNALS

Filed Nov. 22, 1954                    2 Sheets-Sheet 1

INVENTOR.
DOUGLASS H. HOWRY
BY
ATTORNEYS

Jan. 15, 1957    D. H. HOWRY    2,778,002
METHOD OF PRODUCING SHORT PULSE ECHO SIGNALS
Filed Nov. 22, 1954    2 Sheets-Sheet 2

INVENTOR.
DOUGLASS H. HOWRY
BY
ATTORNEYS

United States Patent Office 2,778,002
Patented Jan. 15, 1957

2,778,002

METHOD OF PRODUCING SHORT PULSE ECHO SIGNALS

Douglass H. Howry, Denver, Colo.

Application November 22, 1954, Serial No. 470,444

7 Claims. (Cl. 340—3)

This invention relates to the transmission and reception of mechanical energy such as ultrasonic energy through a transmission medium and particularly to an improved method for securing abruptly terminating echo responsive signals. The invention described herein may be manufactured and used by and for the Government for governmental purposes without the payment of any royalty thereon.

In the operation of ultrasonic apparatus for examining the interiors of bodies of matter, it is desirable to employ energy pulses of short duration and which are terminated abruptly; this insures minimum interference between transmitted pulses and echoes from the interior of the bodies under examination and increases the accuracy of the equipment. When an electroacoustical transducer, for example, a piezoelectric crystal, is driven by impressing thereon a sudden change in voltage, it oscillates at its characteristic frequency and transmits a wave train of mechanical energy having a logarithmically decreasing amplitude; this wave train may be terminated abruptly by impressing upon the transducer a second sudden change in voltage in phase opposition to and of amplitude sufficient to overcome the vibration of the crystal without driving it in the opposite direction. Thus an abruptly terminated energy pulse may be transmitted through the body of medium under investigation. When an echo is received through the transmitting medium by a receiver such as a piezoelectric crystal, the echo initiates the mechanical vibration of the crystal which continues at logarithmically decreasing intensity, and thus produces a wave train of electrical energy of corresponding duration. In order to secure an accurate signal in response to the received echo it is desirable that the received echo wave train also terminate abruptly. Accordingly, it is an object of the present invention to provide an improved method for operating electromechanical transducer apparatus employed for the investigation of the interior of bodies of matter for securing a response to received echoes which is abrupt and of short duration.

In carrying out the objects of this invention in one embodiment thereof, an electroacoustical transducer apparatus is provided which comprises a piezoelectric crystal adapted to transmit and receive pulses of wave energy through the medium to be investigated and which is driven by a pulse generator capable of producing pulses which may be varied in amplitude, in duration and in polarity. Square-wave pulses are employed for driving the crystal and the duration of the pulse is adjusted so that the wave train initiated by the front edge of the pulse is opposed and terminated by the trailing edge of the pulse. As a result the pulse of energy projected through the transmission medium is of short duration and echoes received from objects within the medium or from portions of differing mechanical impedance within the medium are returned as short pulses to the receiving crystal. A second similar pulse is then produced by driving the crystal by a second square-wave of such duration, amplitude and polarity and so timed with respect to the first pulse that an echo of the second pulse corresponding to an echo of the first pulse will reach the receiving crystal in opposition to the wave train or oscillation of the crystal initiated by the first pulse. By selecting the correct amplitude and polarity of the second pulse, the oscillation of the receiving crystal upon receipt of the echo of the first pulse is terminated and thus the signal produced upon receiving an echo is caused to be of short duration and is sharply terminated. In a second embodiment of the invention, a transmitting crystal is driven by a stepped voltage wave to produce two adjacent half-cycle pulses in the transmission medium which are of the same polarity whereby the response to the echo received may be substantially terminated at the end of one cycle.

The features of novelty which characterize the invention will be pointed out with particularity in the claims annexed to and forming a part of this specification.

For a better understanding of the invention, reference is made in the following description to the accompanying drawing, in which.

Figure 1:
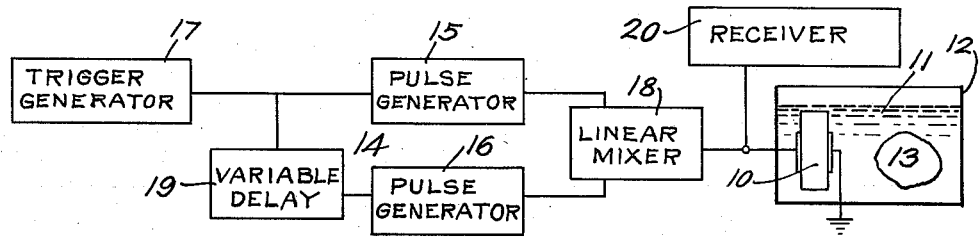
Fig. 1 is a block diagram of an electroacoustical transmitting and receiving apparatus embodying the invention.

The ultrasonic testing apparatus illustrated in Fig. 1 is arranged to drive a transducer such as a piezoelectric crystal 10 to transmit bursts of ultrasonic wave energy through a medium 11 illustrated as a liquid contained in a tank 12 and in which the crystal 10 is immersed. When a wave transmitted by the crystal 10 is intercepted by an object under test, such as indicated at 13, an echo is returned to the crystal. Echoes will also be returned from zones of different mechanical impedance within the object 13 which also constitutes a transmitting medium. In practice the echoes may be received by the same crystal or by a separate receiving crystal normally placed near the transmitting crystal, and the present method is applicable to both these conventional forms of ultrasonic testing equipment. The combined transmitting and receiving transducer form of equipment has been illustrated by way of example.

In order to drive the crystal 10 an electric pulse generating apparatus 14 is provided to impress sudden voltage changes across the crystal 10 for initiating and terminating the desired bursts of ultrasonic energy. The apparatus 14 comprises two pulse generators 15 and 16 which are controlled by a trigger generator 17 and the output voltages of which are supplied to a linear mixer 18 which is connected to apply the output voltage across the crystal 10. The triggering of the pulse generator 16 is delayed with respect to that of the pulse generator 15 by connection of a variable delay control circuit 19 between the trigger generator and the pulse generator 16. A receiving equipment 20 is connected to the crystal 10 and is responsive to echoes received by the crystal. When it is desired to transmit a signal the trigger generator 17 is actuated to energize the pulse generators 15 and 16 and produce two square-wave pulses in timed sequence. The first of these pulses energizes the crystal 10 to initiate transmission of an ultrasonic energy wave through the medium 11. In order to prevent the sustained oscillation of the crystal 10 upon receiving an echo of the transmitted pulse the second pulse is supplied from the generator 16 so that its echo reaches the crystal 10 in opposite phase to a predetermined oscillation of the crystal and of sufficient amplitude to substantially neutralize and terminate the oscillation of the crystal in response to the echo of the first pulse. Thus the receiver 20 is energized by a short echo pulse of such duration that interference with subsequent echoes is effectively minimized.

The pulse generators 15 and 16 are of a type such that they produce square voltage waves or pulses which may be adjusted both in amplitude and duration and also in polarity. The delay circuit 19 may be adjusted to secure the required time spacing of the pulses from the generators 15 and 16. The linear mixer 18 impresses the waves of the two generators 15 and 16 on the crystal 10 without change in form or duration. Pulse generating apparatus of the type described and which is suitable for the practice of the method of this invention is well known in the art and may be obtained on the market. For example, one suitable pulse generator now on the market is the Double Pulse Generator Model 903 sold by the Berkeley Scientific Company of Richmond, California. This generator is capable of generating pulses which may be varied in amplitude from a positive pulse of 50 volts to a negative pulse of 120 volts and which may be adjusted in duration from .1 to 1.2 microseconds. The time delay between the pulses may be varied from 0 to 10 microseconds.

Figure 2:
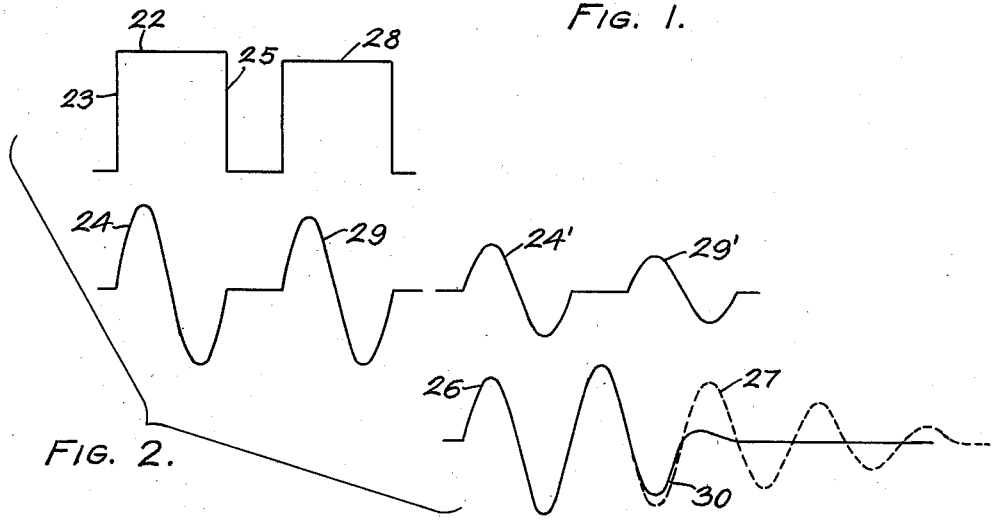
Fig. 2 is a graph comprising a set of four curves illustrating the principle of the method of this invention.

The manner in which the method of this invention is carried out will be more readily apparent from a consideration of the characteristic curves of Fig. 2. These curves are drawn along a time base; the amplitude of the top curve being the voltage of the wave generated by the pulse generator, the amplitudes of the two middle curves being the amplitudes of the ultrasonic energy waves, and the amplitude of the bottom curve being the voltage at the output of the receiving crystal. In the top curve, the square wave 22 is the wave supplied by the generator 15. The initial abrupt voltage rise 23 is impressed on the crystal which transmits an ultrasonic wave indicated at 24 in the second curve of Fig. 2. At the end of the square pulse wave 22, the abrupt voltage change 25 occurs in direct phase opposition to the energy wave 24 of the crystal; this abrupt change in voltage impressed on the crystal tends to drive the crystal to produce a wave similar to the wave 24 but 180° out of phase therewith. As a result the oscillation of the crystal is effectively terminated after the crystal has transmitted a single cycle of ultrasonic wave energy. A predetermined time after the pulse 24 has been transmitted, an echo 24' indicated by the third curve will be returned from the object 13 within the medium 11; the amplitude of the echo pulse has been indicated as less than that of the transmitted pulse in order to represent the decrease inherent in reflection and the attenuation in the medium 11. The crystal being quiescent when the echo 24' reaches it, the echo will initiate oscillation of the crystal to produce an electrical wave train indicated at 26 in the bottom curve of Fig. 2; if this wave train is not interrupted, it will continue along the dotted line 27 indicated as beginning after one and one-half cycles of the wave 26. In Fig. 2 it is assumed that a square wave pulse 28 will be supplied by the generator 16 one-half cycle after the termination of the wave 22. Thus a second energy wave similar to the wave 24 and indicated at 29 will be formed and transmitted through the medium. The square wave 28 is adjusted as to amplitude and duration so that the pulse 29 will be of one cycle similar to the pulse 24 and will have an amplitude such that its echo 29' corresponding to the echo 24' of the pulse 24 will reach the crystal 10 in phase opposition to the oscillation of the crystal set up by the echo 24' and with sufficient amplitude to oppose and effectively prevent further oscillation of the receiving crystal and transmission of electric waves after termination of the echo wave 29'.

As a result the wave 26 will be substantially terminated at the end of one cycle after receiving the echo 29'. It will thus be apparent that by employing the two square-wave pulses 22 and 28, the system has been operated in a manner to effectively shorten the duration of the response of the receiver 20 to the echoes produced within the medium 11. The short response greatly facilitates the interpretation of the received signals and enables the system to be operated to secure discrete signals from echoes received from nearby portions of the object 13.

Figure 3:
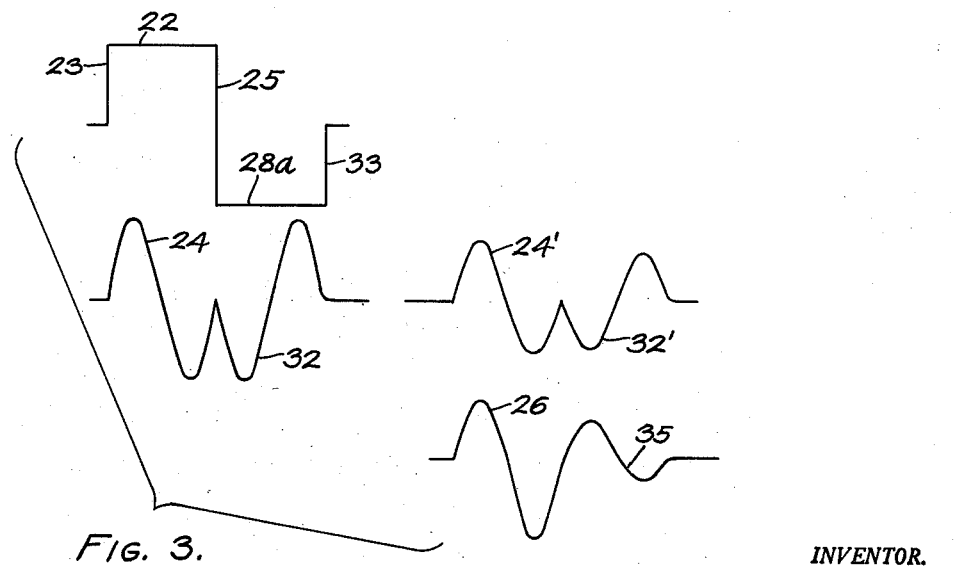
Fig. 3 is a graph comprising a set of four curves further illustrating the principle of the invention.

This method of operation may be employed as indicated in Fig. 3 to provide a signal which is terminated one-half cycle sooner than that of Fig. 2. In the top curve of Fig. 3 the initial pulse from the generator 15 is indicated at 22 and is the same as the pulse 22 of Fig. 2 and produces the same energy waves 24 and 26 as those of Fig. 2. The pulse from the generator 16, however, is produced in opposite phase and immediately following the pulse 22 so that the voltage change 25 is continued in the same direction to produce a negative going pulse 28a which reverses the direction of oscillation of the crystal 10 and produces a second oscillation wave indicated at 32 which is opposite in phase to the pulse which would normally follow the pulse 24. The pulse 32 is terminated abruptly upon the occurrence of the abrupt voltage change 33 of the wave 28a. The effect of this change on the electric wave generated by the crystal 10 upon receiving the echoes 24' and 32' is indicated in the bottom figure of Fig. 3 where it will be noted that the oscillation of the crystal continues after the portion 26 for one more cycle of decreasing amplitude as indicated at 35. Thus, the received wave train is terminated at the end of two cycles rather than at the end of two and one-half cycles as in the curves of Fig. 2.

It is thus apparent that the method of this invention provides not only a signal which is of short duration and abruptly terminated, but a response to echoes of the signal which is also of short duration so that a discrete echo signal is received and greater accuracy of response is assured.

Figure 4:
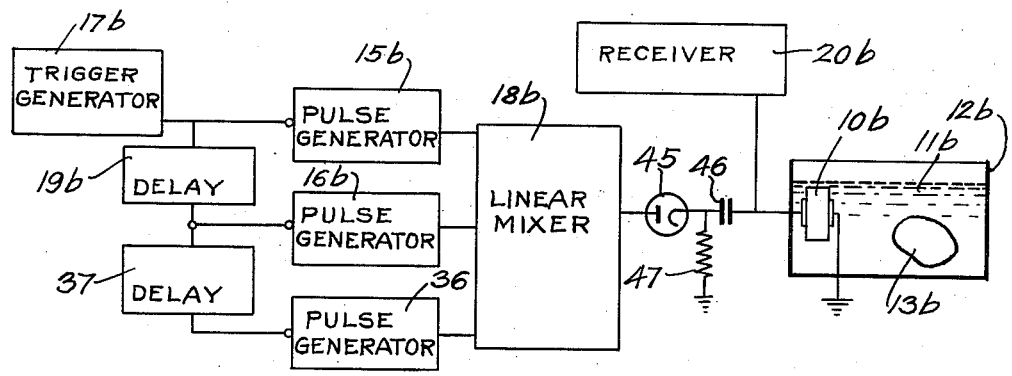
Fig. 4 is a block diagram of the circuit of an apparatus suitable for practicing the invention in a modified form.
Figure 5:
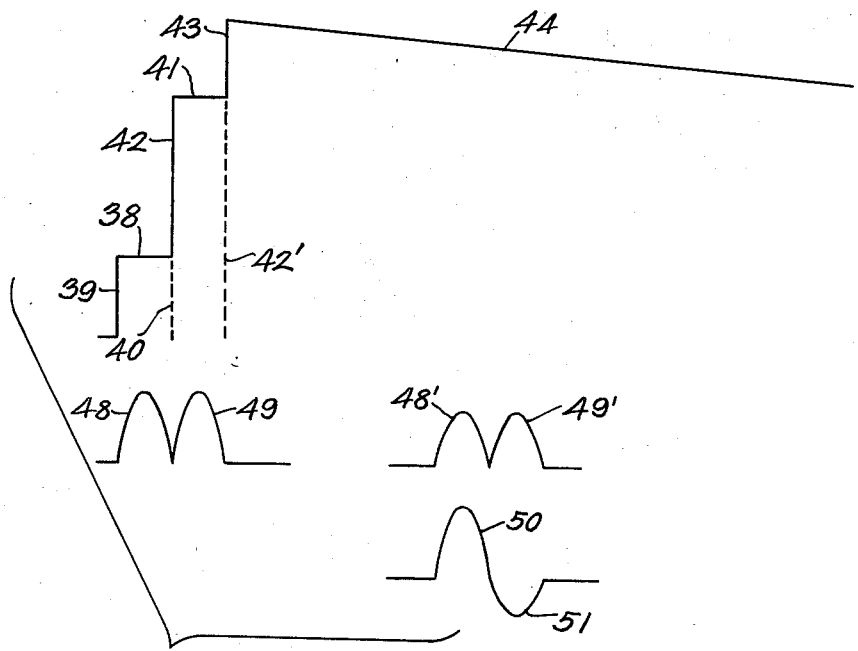
Fig. 5 is a graph comprising four curves illustrating the principle of the modified method.

The apparatus indicated diagrammatically in Fig. 4 is similar to that of Fig. 1 and corresponding parts have been designated by the same numerals with the addition of the suffix letter b. The pulse generating apparatus of Fig. 4 differs from that of Fig. 1 in that it includes an additional pulse generator 36 having its output connected to the linear mixer 18b and its input connected to the trigger generator 17b through the delay element 19b and a second variable delay circuit 37. Thus the pulse generator 36 will supply a pulse to the mixer circuit 18b a predetermined time after the initiation of the pulse for the generator 16b. The time delay between the pulses produced by the generators 15b, 16b and 36 may be adjusted within the limits of the delay circuits 19b and 37 and may vary from zero to a predetermined maximum depending on the characteristics of the delay circuits. It will thus be apparent that by adjusting the timing and amplitude of the pulses produced by the generators 15b, 16b and 36 so that the pulse of the generator 16b is initiated upon termination of the pulse of the generator 15b and the pulse of the generator 36 is initiated upon termination of pulse from the generator 16b, a stepped wave may be produced, as indicated in the top curve of Fig. 5. The pulse supplied by the generator 15b is a square-wave indicated at 38 which includes an initial abrupt rise 39 and is terminated along the dotted line 40. The pulse from the generator 16b, indicated at 41, includes an abrupt rise 42 such that the amplitude of the pulse 41 is of the order of three times that of the pulse 38 and terminates along the dotted line 42'. The pulse supplied by the generator 36 includes an initial abrupt rise 43 which is of the order of four times the rise 39 of the pulse supplied by the generator 15b, and this pulse may be terminated a short time after reaching its maximum amplitude. Thus, the three pulses occurring with zero time spacing provide a stepped wave, each of the first two pulses being of the duration of one-half cycle of the characteristic frequency of the crystal transducer, the second step having the effect of providing a voltage change about double that of the initial change and in the same direction. The abrupt change in voltage occurring at the end of the first half cycle of the wave generated by the crystal is thus 180° opposite the oscillation of the crystal, and because the voltage change is of the order of twice that of the initial change, the amplitude is sufficient to completely overcome the oscillation of the crystal and drive it in the opposite direction to initiate a second wave the first half cycle of which is of the same polarity as the first half cycle of the first wave. At the end of the half cycle 49, the pulse of the generator 36 is applied and the abrupt voltage increase 43 occurs which is in phase opposition to the oscillations of the crystal and of amplitude sufficient to overcome the oscillation which is thus terminated. The voltage is thereupon allowed to decay gradually along a curve, the first portion of which is indicated at 44; this decay is accomplished by providing at the output of the linear mixer a series capacitor 46 and a parallel bleeder resistance 47, together with a diode 45 which isolates the linear mixer from the decay circuit. The time constant of the decay circuit is selected to be great with respect to the pulse length of the generators, but so that the voltage decay is substantially completed at the time of the arrival of the echo signals. As a result of the gradual decay no further driving exitation of the crystal occurs and the oscillations of the crystal are effectively terminated at the end of the second of the two pulses 48 and 49 indicated in the second curve of Fig. 5. Echoes of the two pulses 48 and 49 indicated at 48' and 49' occur sometime later and reach the receiving crystal to produce oscillations, the first half cycle of which is indicated at 50 and the second half cycle at 51. The magnitude of the second pulse 49' is adjusted so that no further oscillations occur after the pulse 51, the pulse 49' being in phase opposition to the oscillations of the receiving transducer initiated by pulse 48' and being of sufficient amplitude to overcome and terminate these oscillations at the end of the first full cycle represented by the pulses 50 and 51. It is thus apparent that by this modification of the method of this invention it is possible to terminate a response to a received pulse at the end of one full cycle thus securing a discreet signal of very short duration.

While the method of this invention has been described in connection with particular circuit arrangements, other apparatus suitable for securing the wave forms indicated in the diagrams will occur to those skilled in the art. Therefore it is not desired that the invention be limited to the employing of the specific arrangements illustrated and described and it is intended by the appended claims to cover all variations which fall within the spirit and scope of the invention.

I claim:

1. In an electromechanical transducer apparatus including means for transmitting pulses of mechanical energy through a body of transmission medium and for receiving echoes of the pulses from within the medium, the method of limiting the duration of response to received echoes which comprises energizing the transmitting means to transmit two discrete pulses of energy through the medium, and timing said pulses so that an echo of the first pulse energizes the receiving means to produce vibration thereof and initiate the production of electrical oscillations and the corresponding echo of the second pulse energizes the receiving means in phase opposite that of a vibration of the receiving means following the initial vibration produced by the first pulse whereby further vibration of the receiving means is substantially prevented.

2. In an electromechanical transducer apparatus including piezoelectric crystal means for transmitting pulses of mechanical energy through a body of transmission medium and for receiving echoes of the pulses from within the medium, the method of limiting the duration of response to received echoes which comprises driving the transmitting crystal means to produce two discrete pulses of energy through the medium and timing the interval between said pulses so that an echo of the first pulse energizes the receiving crystal means to initiate vibration thereof to produce electrical oscillations and the corresponding echo of the second pulse energizes the receiving crystal means in phase opposite to that of a vibration produced by the first pulse whereby further vibration of the receiving crystal means is substantially prevented.

3. In an electromechanical transducer apparatus including means for transmitting pulses of mechanical energy through a body of transmission medium and for receiving echoes of the pulses from within the medium, the method of limiting the duration of response to received echoes which comprises driving the transmitting means to produce an abruptly terminated pulse whereby vibration of the receiving means is initiated by an echo of the pulse from within the medium, driving the transmitting means to produce a second abruptly terminated pulse whereby a corresponding echo of the second pulse is impressed on the receiving means, and adjusting the timing phase and magnitude of the second pulse to oppose the vibration of the receiving means initiated by the first pulse whereby further vibration of the receiving means is substantially prevented.

4. In an electromechanical transducer apparatus for transmitting pulses of mechanical energy through a body of transmission medium and for receiving echoes of the pulses from within the medium, the method of increasing the sharpness of response to received echoes which comprises impressing on the transmitting means a first sudden voltage change to initiate oscillation of the transmitting means to produce a wave train of mechanical energy to initiate oscillation of the receiving means upon reception of an echo from within the medium, thereafter impressing on the transmitting means a second sudden voltage change in phase opposite to that of the mechanical wave train and of sufficient amplitude to effectively prevent further oscillation of the transmitting means whereby the pulse of energy is abruptly terminated, impressing a second similar set of voltage changes on the transmitter means to produce a second similar abruptly terminated pulse, and adjusting the time spacing of the second pulse from the first pulse and adjusting the phase and magnitude of the second pulse to oppose the oscillation of the receiving means initiated by the echo of the first pulse whereby further oscillation of the receiving means is substantially prevented.

5. In an electromechanical transducer apparatus including piezoelectric crystal means for transmitting pulses of mechanical energy through a body of transmission medium and for receiving echoes of the pulses from within the medium, the method of securing sharpness of response to received echoes which comprises impressing on the crystal means a first sudden voltage change to initiate oscillation of the crystal means to produce a train of wave energy to initiate oscillation of the crystal means upon reception of an echo from within the medium, impressing on the crystal means a second sudden voltage change in phase opposite to that of the wave train and of sufficient amplitude to effectively prevent further oscillation of the crystal means whereby the pulse of energy is abruptly terminated, impressing a second similar set of voltage changes on the crystal means to produce a second similar abruptly terminated pulse, and adjusting the time spacing of the second pulse from the first pulse and adjusting the phase and magnitude thereof to oppose the oscillation of the crystal means initiated by the echo of the first pulse whereby further oscillation of the crystal means is substantially prevented upon reception of an echo of said second pulse corresponding to said echo of said first pulse.

6. In an ultrasonic signal apparatus including a piezoelectric crystal for transmitting pulses of ultrasonic wave energy through a body of transmission medium and for receiving echoes of the pulses from within the medium, the method of securing sharpness of response to received echoes, which comprises impressing in order on the crystal first and second square wave voltages to produce two successive pulses of ultrasonic energy, timing the duration of each square wave voltage to terminate with a voltage change in opposite phase to an oscillation of the crystal produced by the initial voltage change of the pulse, and timing the initiation of the second square wave to produce a second pulse for producing an echo from within the medium to activate the crystal as a receiver in opposition to an oscillation of the crystal produced by prior reception of a corresponding echo of the first pulse.

7. In an electromechanical transducer apparatus for transmitting pulses of mechanical energy through a body of transmission medium and for receiving echoes of the pulses from within the medium, the method of increasing the sharpness of response to received echoes which comprises impressing on the transducer a stepped voltage wave comprising three abrupt voltage increases in the same direction each at one-half cycle intervals of the characteristic frequency of the transducer, the first and third steps being of substantially the same amplitude and the second step of the order of twice that amplitude whereby two adjacent one-half cycle pulses of mechanical wave energy of the same polarity are produced by the transducer, and decreasing the impressed voltage gradually to its initial value to prevent further effective driving of the transducer.

No references cited.